US008167305B2

(12) United States Patent
Shiode

(10) Patent No.: US 8,167,305 B2
(45) Date of Patent: May 1, 2012

(54) TRANSPORTING DEVICE AND TRANSPORTING METHOD

(75) Inventor: Takeshi Shiode, Azumino (JP)

(73) Assignee: Seiko Epson Corporation, Tokyo (JP)

(*) Notice: Subject to any disclaimer, the term of this patent is extended or adjusted under 35 U.S.C. 154(b) by 656 days.

(21) Appl. No.: 12/361,332

(22) Filed: Jan. 28, 2009

(65) Prior Publication Data

US 2009/0195844 A1 Aug. 6, 2009

(30) Foreign Application Priority Data

Jan. 31, 2008 (JP) ................................ 2008-021772

(51) Int. Cl.

*B65H 7/08* (2006.01)
*B65H 7/06* (2006.01)
*B41J 29/38* (2006.01)
*H04N 1/034* (2006.01)

(52) U.S. Cl. ......... 271/256; 271/261; 271/3.13; 271/12; 347/16; 347/104; 399/21; 358/296

(58) Field of Classification Search .................. 358/498, 358/496, 296; 271/261, 256, 3.13, 12; 347/16; 399/21

See application file for complete search history.

(56) References Cited

U.S. PATENT DOCUMENTS 7,512,377 B2 * 3/2009 Choi et al. .................... 399/396

FOREIGN PATENT DOCUMENTS

| | | | |
|---|---|---|---|
| JP | 07-215534 | A | 8/1995 |
| JP | 11-073478 | A | 3/1999 |
| JP | 2002-308468 | A | 10/2002 |
| JP | 2003-150914 | A | 5/2003 |
| JP | 2007-136726 | A | 6/2007 |

* cited by examiner

*Primary Examiner* — Cheukfan Lee

(74) *Attorney, Agent, or Firm* — Sughrue Mion, PLLC

(57) ABSTRACT

A transport device and a transporting method. The transporting device includes a transporting unit, a plurality of medium sensing units, an encoder, a paper management module, a determining unit, and a transport controller. When the determining unit determines that a transport error has occurred in a succession transport medium based on a count value for an encoder signal, the paper management module stops counting, and the transport controller controls the transporting unit such that the transporting unit continues transporting a previous transport medium.

3 Claims, 5 Drawing Sheets

TRANSPORTING DEVICE AND TRANSPORTING METHOD

BACKGROUND

1. Technical Field

The present invention relates to a transporting device and a transporting method for transporting a transport medium. In particular, the invention relates to a transporting device and a transporting method for sequentially transporting transport media arranged in line in a transport direction.

2. Related Art

There is an image forming apparatus that, after location information on a transport medium being transported is written in a memory and a transport error occurs and is cleared, controls transporting of the transport medium on the basis of the location information on the transport medium (see, for example, JP-A-7-215534). This image forming apparatus obtains location information on a transport medium subsequent to a transport medium that causes a transport error from the memory and controls transporting of the transport medium after the transport error is cleared. Unfortunately, with this image forming apparatus, it is unclear to ascertain the location of the transport medium that causes the transport error.

One possible transporting device is the one that includes a plurality of medium sensing portions arranged along a transport direction and configured to sense sequentially transported transport media in line in the transport direction and that determines a transport error for each of the transport media while continuing transporting a previous transport medium that does not cause a transport error. If a transport error occurs in front of any of the medium sensing portions, the transporting device continues determining a transport error downstream of that location in the transport direction. However, because a transport medium is not transported to a medium sensing portion arranged downstream of the location of occurrence of the transport error in the transport direction, it is determined that an error has occurred even in front of the downstream medium sensing portion. As a result, a problem is presented in which the location of occurrence of the transport error cannot be ascertained.

SUMMARY

According to a first aspect of the invention, a transporting device includes a transporting unit, a plurality of medium sensing units, an encoder, a paper management module, a determining unit, a transport controller, and an error signaling unit. The transporting unit sequentially transports a plurality of transport media arranged in line in a transport direction. The plurality of medium sensing units are disposed along the transport direction and sense the presence/absence of each of the transport media. The encoder outputs an encoder signal corresponding to an amount of driving for the transporting unit driven to transport each of the transport media. The paper management module counts the encoder signal output from the encoder for each of the transport media to acquire a count value and manages a transport status of each of the transport media. When the count value for the encoder signal reaches a set value set for each of the medium sensing units and it is determined that the medium sensing unit has not sensed the transport medium, the determining unit determines that a transport error has occurred in the transport medium. When the determining unit determines that the transport error has occurred in the transport medium and there is a previous transport medium ahead of the transport medium in which the transport error has occurred, the transport controller controls the transporting unit such that the transporting unit continues transporting the previous transport medium. The error signaling unit signals a location of occurrence of the transport error. The paper management module stops counting up when the determining unit determines that the transport error has occurred in the transport medium. The determining unit determines the location of occurrence of the transport error from the count value for the encoder signal at the time the paper management module stops counting up. The error signaling unit signals the location of occurrence of the transport error determined by the determining unit. Accordingly, in the transporting device that sequentially transports a plurality of transport media arranged in line in the transport direction, detects whether a transport error has occurred in each of the transport media, and continues transporting a previous transport medium, the location of occurrence of the transport error can be prevented from being incorrectly signaled.

The transporting device may further include a paper management module controller that inactivates the (M−N) paper management modules when N is smaller than M, where N is the number of the transport media arranged in line to be transported by the transporting unit and M is the number of the paper management modules. Accordingly, because the number of the paper management modules used in handling a transport error can be reduced, the speed of handling a transport error can be increased.

According to a second aspect of the invention, a transporting method includes sequentially transporting a plurality of transport media arranged in line in a transport direction by a transporting unit, sensing the presence/absence of each of the transport media by a plurality of medium sensing units disposed along the transport direction, outputting an encoder signal corresponding to an amount of driving for the transporting unit driven to transport each of the transport media, counting up the encoder signal for each of the transport media to acquire a count value, when the count value corresponding to each of the transport media reaches a set value set for each of the medium sensing units and it is determined that the medium sensing unit has not sensed the transport medium in the sensing, determining that a transport error has occurred in the transport medium, when it is determined in the determining that the transport error has occurred in the transport medium and there is a previous transport medium ahead of the transport medium in which the transport error has occurred, controlling the transporting unit such that the transporting unit continues transporting the previous transport medium, signaling a location of occurrence of the transport error. In the counting up, the counting up is stopped when it is determined that the transport error has occurred in the transport medium in the determining. In the determining, the location of occurrence of the transport error is determined from the count value at the time the counting up is stopped. In the signaling, the location of occurrence of the transport error determined in the determining is signaled. Accordingly, in the transporting method of sequentially transporting a plurality of transport media arranged in line in the transport direction and sensing whether a transport error has occurred in each of the transport media while continuing transporting a previous transport medium, the location of occurrence of the transport error can be prevented from being incorrectly signaled.

Not all features necessary for the invention are listed in the summary described above. Any sub-combination of these features can also be included in the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention is described below through embodiments. However, the embodiments described below are not intended to limit the invention according to claims. Not all combinations of features described in the embodiments are necessarily required for means for solving the problems of the invention.

Figure 1:
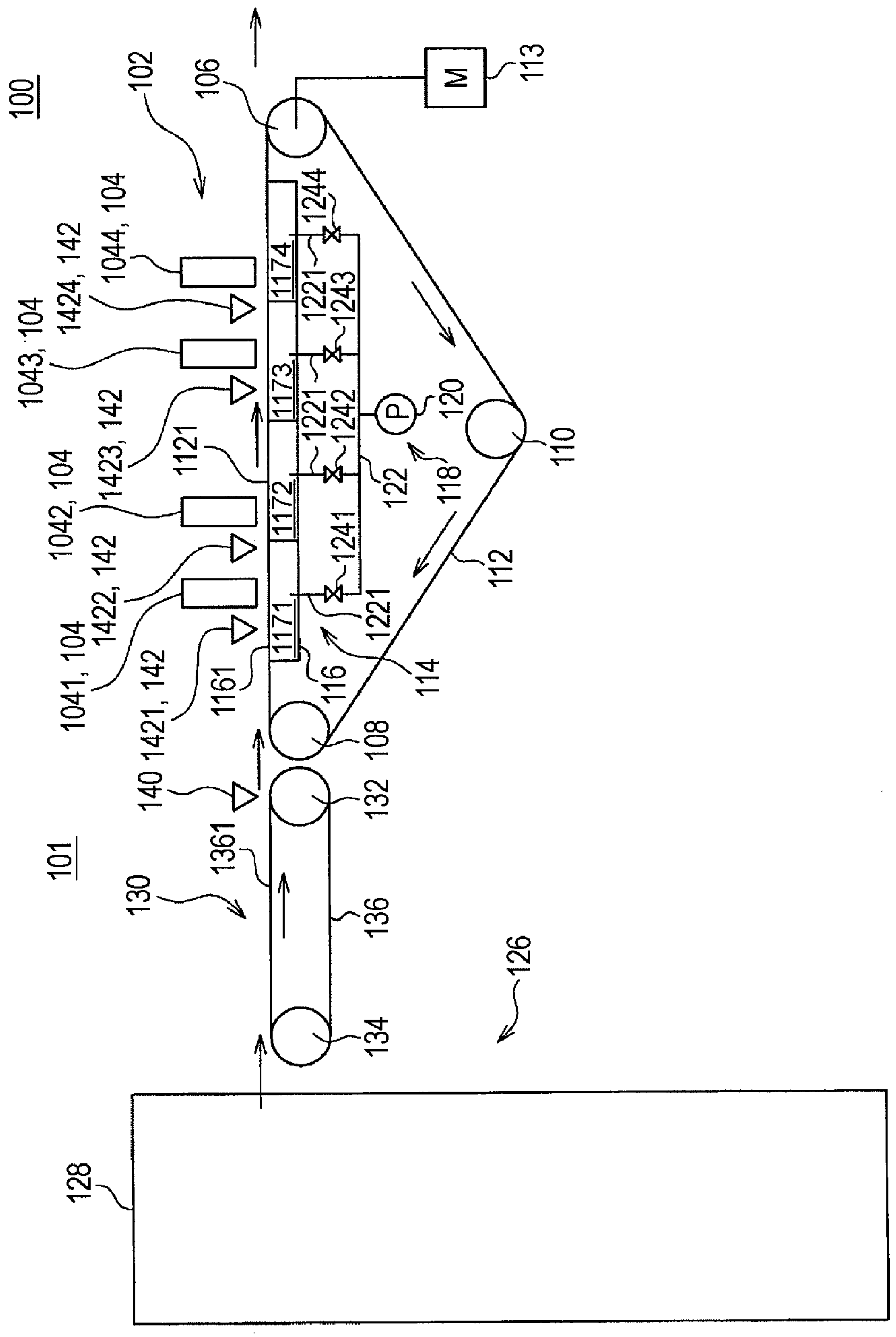
FIG. 1 is a side view that illustrates a schematic configuration of a recording apparatus that includes a transporting device according to one embodiment.

FIG. 1 shows a schematic configuration of an ink jet recording apparatus 101 including a transporting device 100 according to one embodiment of the invention. As illustrated in this drawing, the recording apparatus 101 includes the transporting device 100 and a plurality of recording heads 1041, 1042, 1043, and 1044. The transporting device 100 includes a transporting portion 102 for transporting paper P (see FIG. 2) as a transport medium. The plurality of recording heads 1041, 1042, 1043, and 1044 are arranged in a transport direction in this order. The plurality of recording heads 1041, 1042, 1043, and 1044 are referred to as the recording heads 104 when they are not distinguished from each other.

The transporting portion 102 includes a driving roller 106, driven rollers 108 and 110, an endless belt 112 stretched around these rollers, and a motor 113 for driving the driving roller 106. The driving roller 106 and the driven roller 108 are arranged in a substantially horizontal position. The driven roller 110 is arranged at an intermediate position between the driving roller 106 and the driven roller 108 and below them. That is, the belt 112 is stretched around the driving roller 106, the driven roller 108, and the driven roller 110 in the form of a substantially triangle. A part of the belt 112 (hereinafter referred to as an upper surface 1121) is stretched across the driving roller 106 and the driven roller 108 so as to be arranged in a substantially horizontal position. The upper surface 1121 is long in the transport direction so as to allow a plurality of sheets of paper P to be placed in line along the transport direction.

The plurality of recording heads 104 face the upper surface 1121 and are arranged along the direction of rotation of the belt 112. Each of the recording heads 104 has a recording range longer than the width of the paper P (the length in a direction perpendicular to the transport direction).

The recording head 104 includes a plurality of recording head arrays (not shown) extending along the width direction of the paper P. The plurality of recording head arrays are arranged in the transport direction and correspond to different colors, such as yellow, magenta, cyan, and black.

Each of the recording head arrays includes a plurality of head units spaced at predetermined intervals in the width direction of the paper P. Each of the plurality of head units includes many nozzles arranged in the width direction of the paper P. The head units in each of the plurality of recording heads 1041, 1042, 1043, and 1044 are arranged offset in the width direction of the paper P such that the nozzles are arranged over the entire width of the paper P.

The recording head 104 is a piezoelectric recording head that includes a pressure room (not shown) communicating with each of the nozzles and a piezoelectric element (not shown) arranged so as to correspond to each of the pressure rooms. The displacement of the piezoelectric element upon the application of a driving voltage thereto applies a pressure to ink within the pressure room and discharges the ink through the nozzle.

The driving voltage applied to the piezoelectric element is adjustable, so a voltage lower than a voltage for use in discharging ink may be applied to a piezoelectric element corresponding to a nozzle that will not discharge ink. This low voltage is set to a voltage enough not to allow ink to be discharged through the nozzle. Thus, when the low voltage is applied to the piezoelectric element, ink within the pressure room slightly vibrates in the pressure room without being discharged through the nozzle. Because this causes the ink within the pressure room to flow, thickening and solidification of the ink within the nozzle are suppressed and thus clogging occurring in the nozzle is suppressed.

The transporting portion 102 includes an absorbing portion 114. The absorbing portion 114 includes a platen 116 facing the plurality of recording heads 104. The upper surface 1121 is disposed between the platen 116 and the recording heads 104. The platen 116 is a hollow-body flat member having a surface in contact with the inner surface of the upper surface 1121. A contact surface 1161 of the platen 116 which is in contact with the upper surface 1121 has a plurality of suction holes (not shown) formed lengthwise and crosswise.

The platen 116 includes inner divided chambers 1171, 1172, 1173, and 1174 arranged in the transport direction. The chamber 1171 faces the recording head 1041 with the contact surface 1161 disposed therebetween. The chambers 1172, 1173, and 1174 face the recording heads 1042, 1043, and 1044, respectively, with the contact surface 1161 disposed therebetween.

The absorbing portion 114 includes a sucking-force generating portion 118 for generating a sucking force in the suction holes of the platen 116. The sucking-force generating portion 118 includes a pump 120, a pipe 122 connecting the pump 120 to the chambers 1171, 1172, 1173, and 1174, and a plurality of valves 1241, 1242, 1243, and 1244 disposed so as to correspond to the chambers 1171, 1172, 1173, and 1174, respectively. The pipe 122 includes a plurality of branch portions 1221 branched midway and connected to the chambers 1171, 1172, 1173, and 1174. The valves 1241, 1242, 1243, and 1244 are disposed at the respective branch portions 1221. The valves 1241, 1242, 1243, and 1244 are open/close valves for opening and closing the respective branch portions 1221.

The belt 112 has many air holes (not shown) formed lengthwise and crosswise in its entire area. Thus, when paper P is placed on the upper surface 1121, the valves 1241, 1242, 1243, and 1244 are open, and the pump 120 is activated, then a sucking force is produced in the suction holes of the contact surface 1161 and the air holes of the belt 112 and the paper P is attracted to the belt 112.

The recording apparatus 101 further includes a paper feeder 126 disposed upstream of the transporting portion 102 in the transport direction. The paper feeder 126 includes a paper tray 128 for holding stacked sheets of paper P and a conveying portion 130 for conveying a sheet of paper P from the paper tray 128 to the transporting portion 102. The paper tray 128 is provided with a pickup roller (not shown) by which sheets of paper P are sent one by one from the paper tray 128 to the conveying portion 130.

The conveying portion 130 includes a driving roller 132 and a driven roller 134, both of which are arranged in a substantially horizontal position, and a belt 136 stretched around these rollers. That is, the belt 136 is stretched in a substantially horizontal position by use of the driving roller 132 and the driven roller 134 and has a substantially horizontal upper surface 1361. The belt 136 holds the paper P using the upper surface 1361 and transports the paper P to the belt 112.

In the recording apparatus 101, the conveying portion 130 is provided with a sensor 140, and the transporting portion 102 is provided with sensors 1421, 1422, 1423, and 1424 as a plurality of medium sensing portions. The sensor 140 faces the upper surface 1361 of the belt 136 and senses the presence/absence of paper P on the belt 136. The sensors 1421, 1422, 1423, and 1424 face the upper surface 1121 of the belt 112 and sense the presence/absence of the paper P being transported in the recording ranges of the plurality of recording heads 1041, 1042, 1043, and 1044, respectively. The plurality of sensors 1421, 1422, 1423, and 1424 are referred to as the sensors 142 when they are not distinguished from each other.

The sensor 1421 is arranged upstream of the recording head 1041 and downstream of the driven roller 108 in the transport direction and senses the presence/absence of the paper P passing through the recording range of the recording head 1041. The sensor 1422 is arranged upstream of the recording head 1042 and downstream of the recording head 1041 in the transport direction and senses the presence/absence of the paper P passing through the recording range of the recording head 1042.

The sensor 1423 is arranged upstream of the recording head 1043 and downstream of the recording head 1042 in the transport direction and senses the presence/absence of the paper P passing through the recording range of the recording head 1043. The sensor 1424 is arranged upstream of the recording head 1044 and downstream of the recording head 1043 in the transport direction and senses the presence/absence of the paper P passing through the recording range of the recording head 1044. Here, the number of sheets of paper P having the minimum length X in the transport direction among usable sheets of paper P arranged in line along the transport direction on the belt 112 (e.g., four in the present embodiment) is the same as the number of the sensors 142 (e.g., four in the present embodiment).

Figure 2:
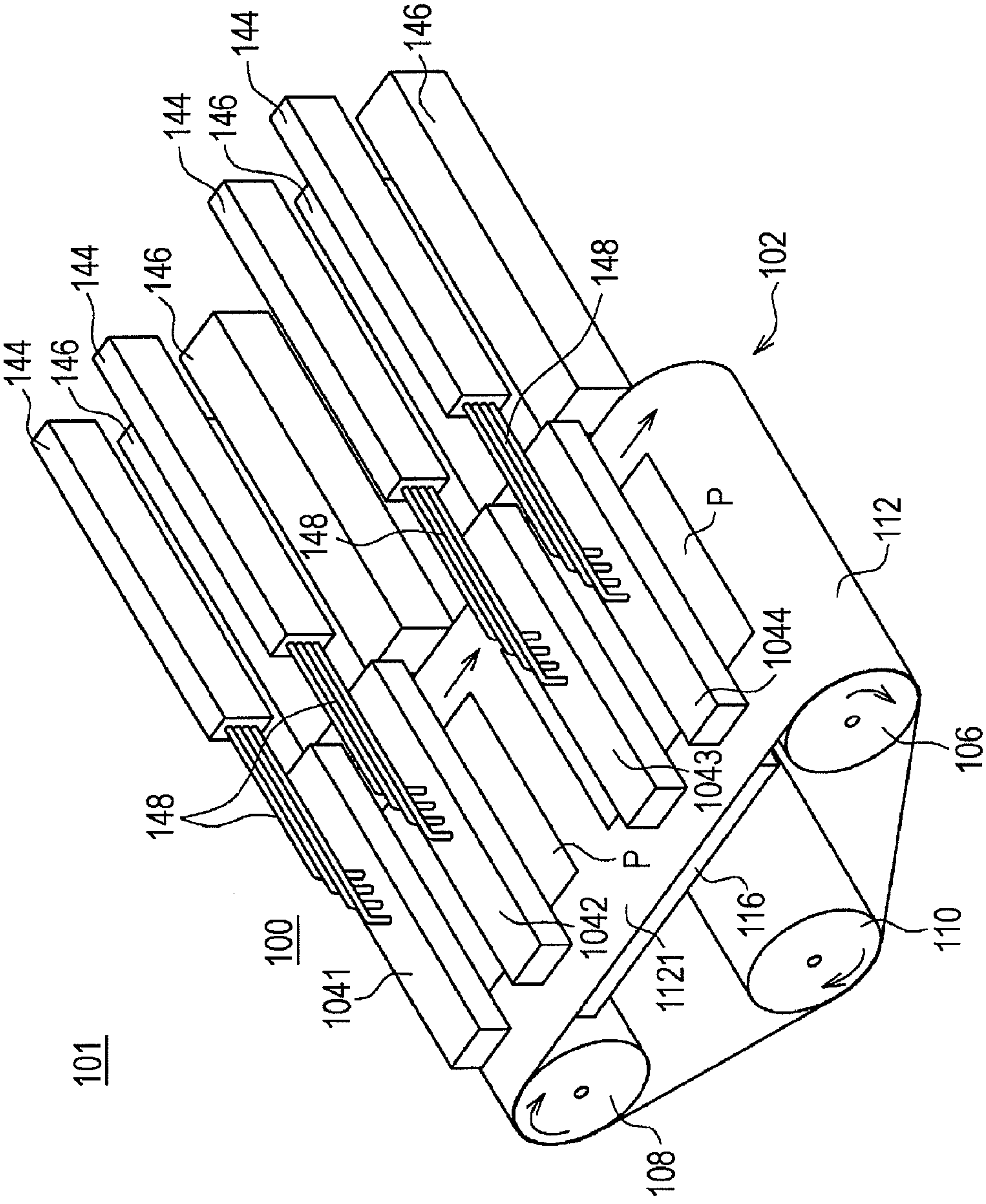
FIG. 2 is a perspective view that illustrates a transport portion, a recording head, and other components.

FIG. 2 is a perspective view that illustrates the transporting portion 102, the recording head 104, and other components. As illustrated in this drawing, a plurality of ink supplying portions 144 and a plurality of head maintenance portions 146 are arranged adjacent to one side of the belt 112 in the width direction thereof. The ink supplying portions 144 and the head maintenance portions 146 correspond to the respective recording heads 104. The ink supplying portions 144 are connected to the respective recording heads 104 through pipes 148 (e.g., rubber tube) and supply ink to the respective recording heads 104 from ink tanks (not shown).

Each of the head maintenance portions 146 is arranged below the side of the corresponding recording head 104. The recording head 104 is slidable to the maintenance position above the head maintenance portion 146 by use of a sliding mechanism (not shown). The head maintenance portion 146 performs a predetermined maintenance operation, such as sucking, wiping, and capping, on the recording head 104 when the recording head 104 is slit and positioned at the maintenance position.

Figure 3:
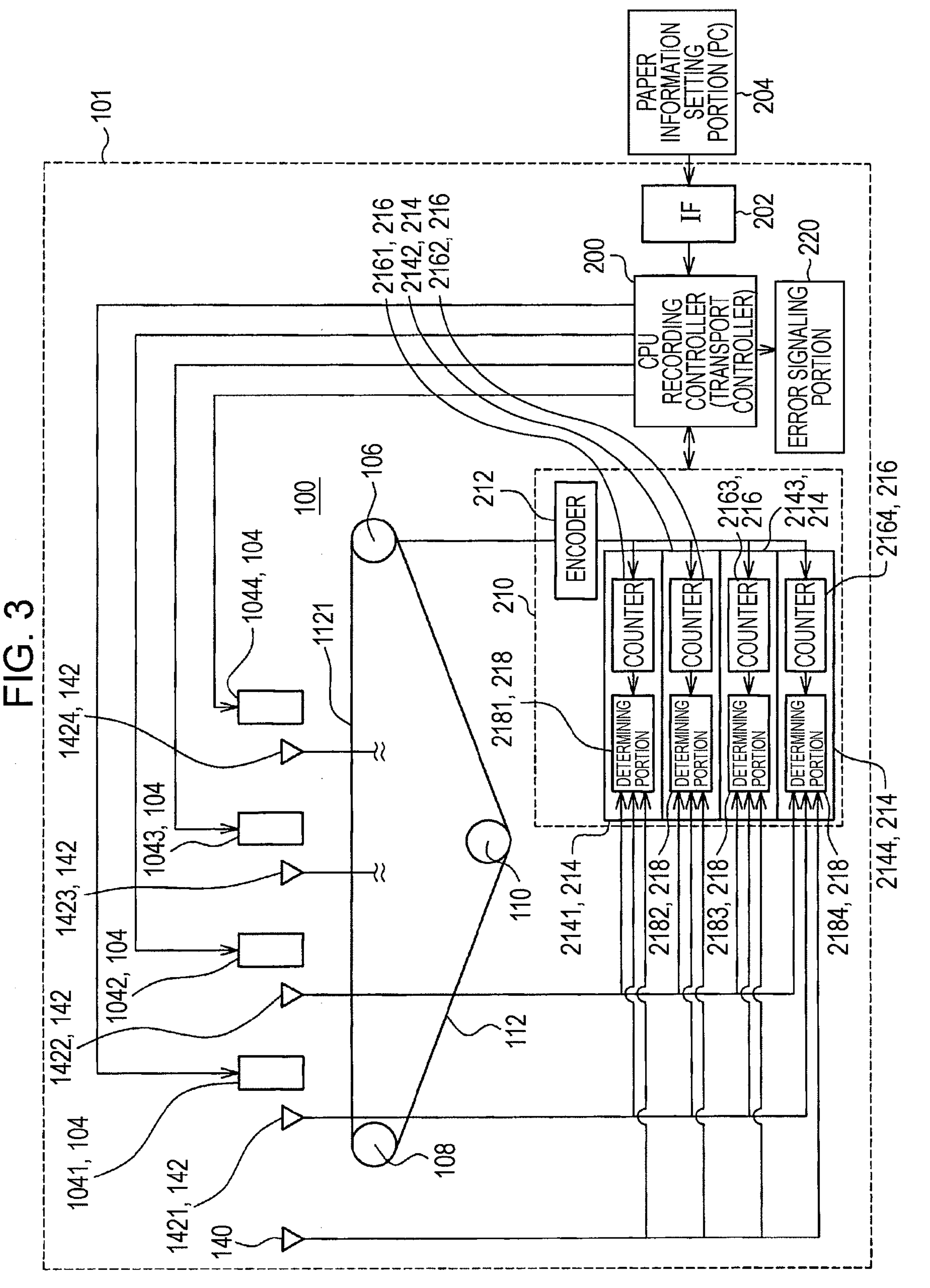
FIG. 3 is a block diagram that illustrates a schematic configuration of the transporting device.

FIG. 3 is a block diagram that illustrates a schematic configuration of a control system of the recording apparatus 101. As illustrated in this drawing, the recording apparatus 101 includes a central processing unit (CPU) 200, which serves as a transport control portion and a recording control portion, and an interface (IF) 202, which serves as a signal input portion.

The CPU 200 is connected to a random-access memory (RAM), which is not shown and serves as an image data storing portion. The CPU 200 determines the time of discharging ink droplets and a nozzle to be used in accordance with image data written in the RAM and transmits a driving signal to the recording heads 104. The CPU 200 is also connected to the motor 113. The motor 113 is controlled by the CPU 200. The IF 202 is connected to a paper information setting portion 204 provided in, for example, a personal computer (PC) and receives information indicating, for example, the size and type of the paper P set by the paper information setting portion 204.

The transporting device 100 includes an error determining section 210. The error determining section 210 includes an encoder 212 and a plurality of paper management modules 2141, 2142, 2143, and 2144 corresponding to respective sheets of paper P. The error determining section 210 determines occurrence of a transport error for each of the sheets of paper P occurs on the basis of the amount D of driving for the transporting portion 102 driven to transport the sheets of paper P and the sensing performed by the sensors 142. The CPU 200 sequentially associates the paper management modules 2141, 2142, 2143, and 2144 with a plurality of sheets of paper P being transported by the belt 112. Each of the paper management modules 2141, 2142, 2143, and 2144 determines occurrence of a transport error of the associated paper P occurs until the associated paper P is ejected from the transporting portion 102. The paper management modules 2141, 2142, 2143, and 2144 are referred to as the paper management modules 214 when they are not distinguished from each other.

The encoder 212 outputs an encoder signal corresponding to the phase of rotation or the amount of rotation of the motor 113 or the belt 112. Each of the paper management modules 214 includes a counter 216 for counting up an encoder signal that is associated with each of the sheets of paper P and that is output from the encoder 212 and a determining portion 218 for determining a transport error of the associated paper P. When it is necessary to distinguish the counters 216 included in the paper management modules 2141, 2142, 2143, and 2144, the counters 216 are expressed as the counters 2161, 2162, 2163, and 2164. When it is necessary to distinguish the determining portions 218 included in the paper management modules 2141, 2142, 2143, and 2144, the determining portions 218 are expressed as the determining portions 2181, 2182, 2183, and 2184.

Each of the determining portions 218 receives sensing signals from all the sensors 142. Although not shown in the drawing, the sensors 1423 and 1424 also input sensing signals to the determining portions 218.

Even when the count value of the counter 216 exceeds a set value C1, that is, the amount D of driving for the transporting portion 102 exceeds a set value D1, if the sensor 1421 has not sensed associated paper P, the determining portion 218 determines that a transport error has occurred in that paper P. Here, where the distance from the sensing position of the sensor 140 to the sensing position of the sensor 1421 along the transport path of the paper P is L1, when the transporting portion 102 is driven by the amount D1, the paper P is transported by the distance L1.

Even when the count value of the counter for the sensor 1422 exceeds a set value C2 (>C1), that is, the amount D of driving for the transporting portion 102 exceeds a set value D2 (>D1), if the sensor 1422 has not sensed the associated paper P, the determining portion 218 determines that a transport error has occurred in that paper P. Here, where the distance from the sensing position of the sensor 140 to the sensing position of the sensor 1422 along the transport path of the paper P is L2, when the transporting portion 102 is driven by the amount D2, the paper P is transported by the distance L2.

Even when the count value of the counter for the sensor 1423 exceeds a set value C3 (>C2), that is, the amount D of driving for the transporting portion 102 exceeds a set value D3 (>D2), if the sensor 1423 has not sensed associated paper P, the determining portions 218 determines that a transport error occurs in that paper P. Here, where the distance from the sensing position of the sensor 140 to the sensing position of the sensor 1423 along the transport path of the paper P is L3, when the transporting portion 102 is driven by the amount D3, the paper P is transported by the distance L3.

Even when the count value of the counter for the sensor 1424 exceeds a set value C4 (>C3), that is, the amount D of driving for the transporting portion 102 exceeds a set value D4 (>D3), if the sensor 1424 has not sensed the associated paper P, the determining portion 218 determines that a transport error has occurred in that paper P. Here, where the distance from the sensing position of the sensor 140 to the sensing position of the sensor 1424 along the transport path of the paper P is L4, when the transporting portion 102 is driven by the amount D4, the paper P is transported by the distance L4.

When the sensor 1424 has sensed the associated paper P, if the sensor 1424 continues to sense the paper P after the count value of the counter 216 exceeds a set value C5, that is, the amount D of driving for the transporting portion 102 exceeds a set value D5, the determining portion 218 determines that a transport error has occurred in that paper P. Here, when the transporting portion 102 is driven by the amount D5, the paper P is transported by the distance (L4+X) and passes through the sensing position of the sensor 1424.

When the determining portion 218 detects a transport error occurring in associated paper P, if there is previous paper P being transported ahead of the paper P in which a transport error has occurred, the CPU 200 makes the transporting portion 102 continue transporting the previous paper P and the corresponding recording head 104 continue recording information on the previous paper P. In contrast, the CPU 200 stops printing performed by the recording head 104 on the paper P in which a transport error has occurred. The CPU 200 makes the recording head(s) 104 downstream of the location where a transport error has been detected in the transport direction continue recording, whereas the CPU 200 makes the recording head(s) 104 upstream of that location in the transport direction stop recording.

The CPU 200 makes the absorbing portion 114 continue attracting paper P downstream of the location where the transport error has been detected in the transport direction, whereas the CPU 200 makes the absorbing portion 114 stop attracting paper P upstream of that location in the transport direction. That is, the CPU 200 continues opening of the value(s) positioned downstream of the location where the error has been detected in the transport direction among the valves 1241, 1242, 1243, and 1244 corresponding to the chambers 1171, 1172, 1173, and 1174. The CPU 200 closes the value(s) positioned upstream of the location where the error has been detected in the transport direction among the valves 1241, 1242, 1243, and 1244 corresponding to the chambers 1171, 1172, 1173, and 1174. The CPU 200 continues driving the pump 120.

When the determining portion 218 detects a transport error occurring in the paper P in the recording range of one of the plurality of recording heads 104, the CPU 200 makes the recording head(s) 104 upstream of the location where the transport error has been detected in the transport direction vibrate such that ink within the upstream recording head(s) slightly vibrates. More specifically, the CPU 200 applies a driving voltage for use in recording, i.e., a voltage enough to cause ink to be discharged from a nozzle, to the piezoelectric element(s) of the recording head(s) 104 downstream of the location where the transport error has been detected in the transport direction. The CPU 200 applies the above-described low voltage, i.e., a voltage enough not to allow ink to be discharged from a nozzle to the piezoelectric element(s) of the recording head(s) 104 upstream of the location where the transport error has been detected in the transport direction.

The CPU 200 outputs a specifying signal that specifies the number of paper management modules 214 to be activated to the error determining section 210 on the basis of information about the paper P input to the IF 202. Here, where the maximum number of sheets of paper P placeable on the belt 112 is N and the number of the paper management modules 214 is M (>N), the N paper management modules 214 are cyclically activated and the (M−N) paper management modules 214 are inactivated. For example, when the paper P is paper having a size that allows four sheets to be placed on the belt 112 at the maximum (e.g., the above-described paper having the length X in the transport direction), all of the four paper management modules 214 is activated. When the paper P is paper having a size that allows two sheets to be placed on the belt 112 at the maximum, the two paper management modules 214 are activated and the rest of the paper management modules 214 is inactivated.

The CPU 200 is connected to an error signaling portion 220 for signaling a user of occurrence of a transport error and the location thereof (e.g., a display panel). The determining portion 218 derives the location of occurrence of a transport error from the count value of the counter 216 at the time the transport error is detected. Then, the CPU 200 makes the error signaling portion 220 signal the location of occurrence of the transport error derived by the determining portion 218 together with the occurrence of the transport error.

An operation of the recording apparatus 101 will be described next with reference to the flowchart illustrated in FIG. 4 and the operation diagram illustrated in FIG. 5. First, when the CPU 200 receives a print job, a process routine is started. In this process routine, the CPU 200 determines whether the sensor 140 has sensed paper P (step S100). When the CPU 200 determines that the sensor 140 has not sensed the paper P (NO in step S100), all of the paper management modules 214 is made to be in a ready state; that is, reception of an encoder signal from all of the counters 216 is disabled (step S102).

When the CPU 200 determines that the sensor 140 has sensed the paper P (YES in step S100), the CPU 200 makes the paper management module 2141 start its processing. More specifically, the CPU 200 associates the paper management module 2141 with the paper P sensed by the sensor 140. In the paper management module 2141, the counter 2161 starts counting up an encoder signal. The CPU 200 makes all of the recording heads 104 be in a ready to print state (step S104). Every time sheets of subsequent paper P are transported to the sensing position of the sensor 140, the CPU 200 associates the subsequent sheets of paper P with the paper management modules 2142, 2143, and 2144, respectively, in this order.

In the process routine described below, the process performed by the paper management module 2141 is described by way of example. Although the description of the other paper management modules 2142, 2143, and 2144 is not provided here, they also perform substantially the same process as the process performed by the paper management module 2141.

Then, the determining portion 2181 in the paper management module 2141 determines whether the sensor 1421 has sensed the paper P (step S106). When the determining portion 2181 determines that the sensor 1421 has not sensed the paper P (NO in step S106), the determining portion 2181 determines whether the count value of the counter 2161 has exceeded the set value C1, that is, a transport error (paper jam) has occurred in the paper P sensed by the sensor 140 (step S108).

When the determining portion 2181 determines that a transport error has not occurred (NO in step S108), the CPU 200 repeats processing from step S104 to step S108. When the determining portion 2181 determines that a transport error has occurred (YES in step S108), the CPU 200 makes the paper management module 2141 be in a ready state and reception of an encoder signal from the counter 2161 is disabled (step S102). At this time, the paper management modules 2142, 2143, and 2144 for subsequent sheets of paper P are also made to be in a ready state, and reception of an encoder signal from the counters 2162, 2163, and 2164 is also disabled.

Figure 5A:
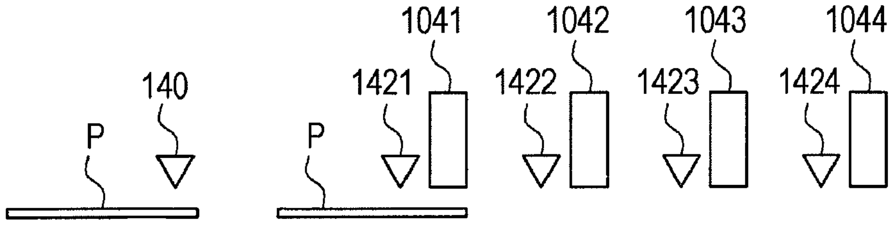
FIG. 5 is a schematic side view that describes an operation of the transporting device.

As illustrated in FIG. 5A, the sensor 1421 continues to sense the paper P until the paper P passes through the sensing position of the sensor 1421 (step S110). Then, the determining portion 2181 determines whether the paper P has been sensed by the sensor 1422 (step S112). When the determining portion 2181 determines that the paper P has not been sensed by the sensor 1422 (NO in step S112), the determining portion 2181 determines whether the count value for the encoder signal has exceeded the set value C2, that is, a transport error (paper jam) has occurred in the paper P sensed by the sensor 1421 (step S114).

When the determining portion 2181 determines that a transport error has not occurred (NO in step S114), the CPU 200 repeats processing from step S110 to step S114. When the determining portion 2181 determines that a transport error has occurred (YES in step S114), the CPU 200 makes the paper management module 2141 be in a ready state and disables reception of an encoder signal from the counter 2161 (step S102).

Figure 5B:
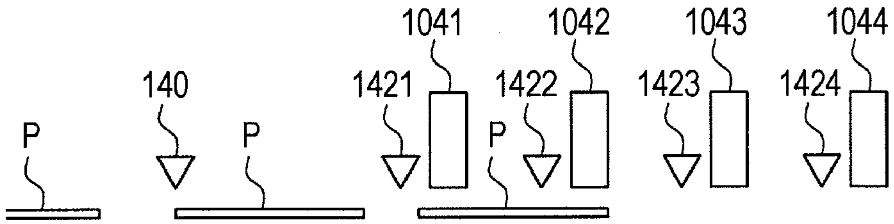

As illustrated in FIG. 5B, the sensor 1422 continues to sense the paper P until the paper P passes through the sensing position of the sensor 1422 (step S116). Then, the determining portion 2181 determines whether the paper P has been sensed by the sensor 1423 (step S118). When the determining portion 2181 determines that the paper P has not been sensed by the sensor 1423 (NO in step S118), the determining portion 2181 determines whether the count value for the encoder signal has exceeded the set value C3, that is, a transport error (paper jam) has occurred in the paper P sensed by the sensor 1423 (step S120).

When the determining portion 2181 determines that a transport error has not occurred (NO in step S120), the CPU 200 repeats processing from step S116 to step S120. When the determining portion 2181 determines that a transport error has occurred (YES in step S120), the CPU 200 makes the paper management module 2141 be in a ready state and disables reception of an encoder signal from the counter 2161 (step S102).

Figure 5C:
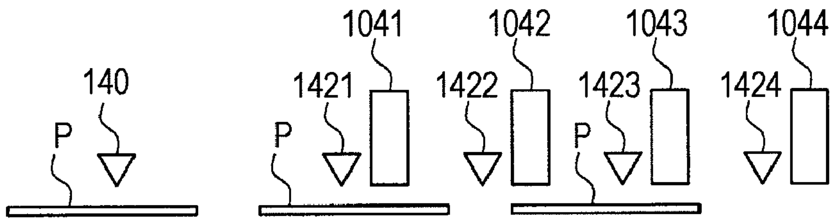

As illustrated in FIG. 5C, the sensor 1423 continues to sense the paper P until the paper P passes through the sensing position of the sensor 1423 (step S122). Then, the determining portion 2181 determines whether the paper P has been sensed by the sensor 1424 (step S124). When the determining portion 2181 determines that the paper P has not been sensed by the sensor 1424 (NO in step S124), the determining portion 2181 determines whether the count value for the encoder signal has exceeded the set value C4, that is, a transport error (paper jam) has occurred in the paper P sensed by the sensor 1424 (step S126).

When the determining portion 2181 determines that a transport error has not occurred (NO in step S126), the CPU 200 repeats processing from step S122 to step S126. When the determining portion 2181 determines that a transport error has occurred (YES in step S126), the CPU 200 makes the paper management module 2141 be in a ready state and disables reception of an encoder signal from the counter 2161 (step S102).

Figure 5D:
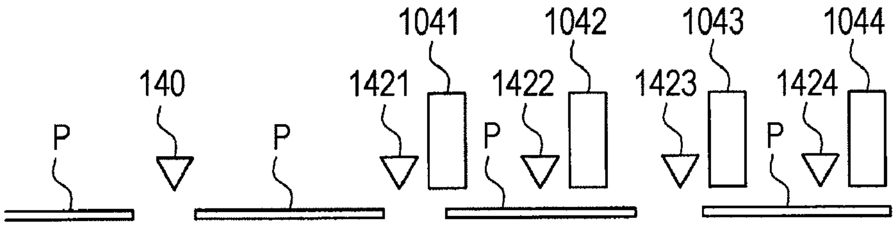

As illustrated in FIG. 5D, the sensor 1424 continues to sense the paper P until the paper P passes through the sensing position of the sensor 1424 (step S128). During this operation, the CPU 200 determines whether printing has been completed (step S130). In the present embodiment, the CPU 200 determines whether the sensor 1424 has been turned off, that is, the rear end of the paper P has passed through the sensing position of the sensor 1424. When the CPU 200 determines that the rear end of the paper P has passed through the sensing position of the sensor 1424 (YES in step S130), the count value of the counter 2161 is cleared (step S132). Then, the process routine exits.

When the CPU 200 determines that the rear end of the paper P has not passed through the sensing position of the sensor 1424 (NO in step S130), the determining portion 2181 determines whether the count value for the encoder signal has exceeded the set value C5, that is, a transport error (paper jam) has occurred in the paper P sensed by the sensor 1424 (step S134). When the determining portion 2181 determines that a transport error has not occurred (NO in step S134), the CPU 200 repeats processing from step S128 to step S134. When the determining portion 2181 determines that a transport error has occurred (YES in step S134), the CPU 200 makes the paper management module 2141 be in a ready state and disables reception of an encoder signal from the counter 2161 (step S102).

The determining portion 2181 determines the location of occurrence of the transport error in the paper P from the count value of the counter 2161 at the time reception of an encoder signal is disabled. Then, the CPU 200 makes the error signaling portion 220 signal the location of occurrence of the transport error determined by the determining portion 2181 and the occurrence of the transport error (step S136). At this time, the determining portions 2182, 2183, and 2184 do not determine whether a transport error has occurred in subsequent paper P, and the error signaling portion 220 does not provide information about a transport error in the subsequent sheets of paper P. When paper P is transported to the transporting portion 102 and sensed by the sensor 140 after a paper jam is handled (YES in step S100), the CPU 200 enables reception of an encoder signal from the counter 216 (step S104).

In the present embodiment, even when the error determining section 210 determines that a transport error has occurred, transporting previous paper P ahead of the paper P in which the transport error has occurred continues. Accordingly, unlike the present embodiment, if reception of an encoder signal from the counter 216 continues to be enabled even after the transport error has occurred, because the sensor(s) 142 downstream of the location of occurrence of the transport error in the transport direction does not sense paper P, the determining portion 218 would incorrectly determine that a transport error has occurred even in the downstream of the location of occurrence of the true error.

In contrast to this, according to the present embodiment, at the time the transport error occurs, reception of an encoder signal from the counters 216 corresponding to the paper P in which the transport error has occurred and its subsequent paper P is disabled. That is, at the time the transport error occurs, the error determining section 210 stops determination whether a transport error has occurred in the paper P in which the transport error has occurred and its subsequent paper P. Therefore, even when it is determined whether a transport error has occurred for each of sheets of paper P arranged in line and sequentially transported in the transport direction while transporting previous paper P continues, the location where the transport error has occurred can be accurately ascertained. Accordingly, because the location of occurrence of the transport error can be accurately signaled to a user, handling of a paper jam can be facilitated. In particular, for a large-size recording apparatus having a long transport path, the accurate ascertainment of the location of occurrence of a transport error offers a larger advantageous effect of facilitating handling of a paper jam.

Disabling reception of an encoder signal from the counters 216 corresponding to the paper P in which the transport error has occurred and its subsequent paper P can facilitate ascertainment of the location of occurrence of the transport error. That is, because control for detection of a transport error can be simplified, the cost can be reduced.

In the present embodiment, when the number N of sheets of paper P arranged in line on the belt 112 to be transported is smaller than the number M of the paper management modules 214, the N paper management modules 214 are cyclically activated and the (M−N) paper management modules 214 are inactivated. Accordingly, because the number of the paper management modules 214 used in handling a transport error can be reduced, the speed of handling a transport error can be increased.

It is noted that inactivation of the (M−N) paper management modules 214 is not necessarily required and a certain number of the paper management modules 214, the certain number being larger than the number N of sheets of paper P, may be cyclically activated. In this case, each of the paper management modules 214 that finish their determination whether a transport error has occurred in associated paper P can have an enough reset time.

Figure 4:
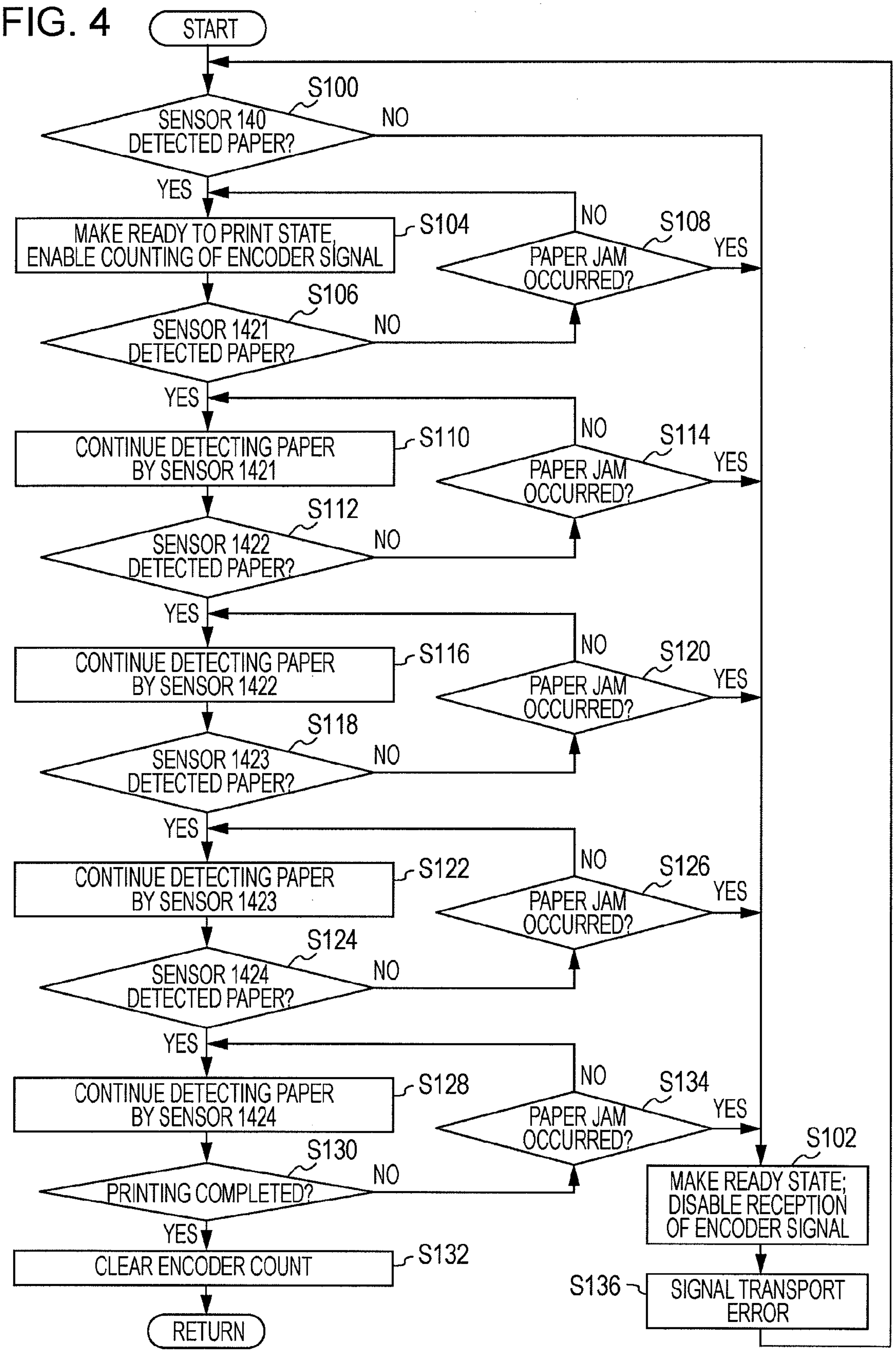
FIG. 4 is a flowchart that describes an operation of the transporting device.

The operation illustrated in the flowchart of FIG. 4 may be performed by execution of a computer-executable program. In this case, the computer-executable program may be installed in the recording apparatus 101 through a storage medium, such as a compact disk (CD). Alternatively, the computer-executable program obtained through a network, such as the Internet, may also be installed in the recording apparatus 101.

The invention is described above by use of the embodiment, but the technical scope of the invention is not limited to the above-described embodiment. It will be apparent to those skilled in the art that various kinds of modification and improvement may be made in the above-described embodiment. It will be apparent from the claims that forms in which such modification or improvement is made are also included in the technical scope of the invention.

For example, in the above-described embodiment, the ink jet recording apparatus 101 is described by way of example. However, other examples of the apparatus to which the invention can also be used include another recording apparatus, such as an electrophotographic recording apparatus, and an apparatus other than a recording apparatus, such as a testing apparatus for testing a transport medium transported by a transporting device. Also in such examples, the location of occurrence of a transport error can be accurately signaled to a user, and handling of a paper jam can be facilitated, similar to the above-described embodiment.

In the above-described embodiment, the paper management module 214 includes the determining portion 218. However, a program executable by the CPU 200 may also be functioned as the determining portion 218. In this case, the CPU 200 determines whether a transport error has occurred in a transport medium using interrupt control or polling control.

The paper management module 214 may execute control of activating an interrupt signal of an interrupt line connected to the CPU 200 when the count value of the counter 216 reaches a set value set for each of the medium sensing portions as management of a transport status of each transport medium, and the CPU 200 may determine a transport error by determining whether the transport medium has been sensed by the medium sensing portion using the interrupt signal as a trigger. Alternatively, the paper management module 214 may execute control of activating an interrupt signal when the count value of the counter 216 reaches a set value set for each of the medium sensing portions and the medium sensing portion has sensed no transport medium as management of a transport status of each transport medium, and the CPU 200 may determine a transport error from the activation of the interrupt signal. Alternatively, the CPU 200 may refer to the paper management module 214 in predetermined polling cycles, check the count value of the counter 216, and determine a status where the count value reaches a set value set for each of the medium sensing portions and the medium sensing portion has sensed no transport medium.

What is claimed is:

1. A transporting device comprising:

a transporting unit that sequentially transports a plurality of transport media arranged in line in a transport direction;

a plurality of medium sensing units that are disposed along the transport direction and that sense the presence/absence of each of the transport media;

an encoder that outputs an encoder signal corresponding to an amount of driving for the transporting unit driven to transport each of the transport media;

a paper management module that counts the encoder signal output from the encoder for each of the transport media to acquire a count value and that manages a transport status of each of the transport media;

a determining unit that, when the count value for the encoder signal reaches a set value set for each of the medium sensing units and it is determined that the medium sensing unit has not sensed the transport medium, determines that a transport error has occurred in the transport medium;

a transport controller that, when the determining unit determines that the transport error has occurred in the transport medium and there is a previous transport medium ahead of the transport medium, controls the transporting unit such that the transporting unit continues transporting the previous transport medium; and an error signaling unit that signals a location of occurrence of the transport error, wherein the paper management module stops counting up when the determining unit determines that the transport error has occurred in the transport medium, wherein the determining unit determines the location of occurrence of the transport error from the count value for the encoder signal at the time the paper management module stops counting up, and wherein the error signaling unit signals the location of occurrence of the transport error determined by the determining unit.

2. The transporting device according to claim 1, further comprising a paper management module controller that inactivates the (M−N) paper management modules when N is smaller than M, where N is the number of the transport media arranged in line to be transported by the transporting unit and M is the number of the paper management modules.

3. A transporting method comprising:

sequentially transporting a plurality of transport media arranged in line in a transport direction by a transporting unit;

sensing the presence/absence of each of the transport media by a plurality of medium sensing units disposed along the transport direction;

outputting an encoder signal corresponding to an amount of driving for the transporting unit driven to transport each of the transport media;

counting up the encoder signal for each of the transport media to acquire a count value;

when the count value corresponding to each of the transport media reaches a set value set for each of the medium sensing units and it is determined that the medium sensing unit has not sensed the transport medium in the sensing, determining that a transport error has occurred in the transport medium;

when it is determined in the determining that the transport error has occurred in the transport medium and there is a previous transport medium ahead of the transport medium in which the transport error has occurred, controlling the transporting unit such that the transporting unit continues transporting the previous transport medium; and signaling a location of occurrence of the transport error, wherein, in the counting up, the counting up is stopped when it is determined that the transport error has occurred in the transport medium in the determining, wherein, in the determining, the location of occurrence of the transport error is determined from the count value at the time the counting up is stopped, and wherein, in the signaling, the location of occurrence of the transport error determined in the determining is signaled.

* * * * *